(12) United States Patent
Essiambre et al.

(10) Patent No.: US 6,693,929 B1
(45) Date of Patent: Feb. 17, 2004

(54) ARRANGEMENT FOR GENERATING CHIRPED RETURN TO ZERO (CRZ) OPTICAL DATA SIGNALS

(76) Inventors: Rene'-Jean Essiambre, 16 Pinckney Rd. Apt. #2, Red Bank, NJ (US) 07701; Peter J. Winzer, Rothenburger Str. 55, 90443 Nuremberg (DE)

( * ) Notice: Subject to any disclaimer, the term of this patent is extended or adjusted under 35 U.S.C. 154(b) by 26 days.

(21) Appl. No.: 10/205,643

(22) Filed: Jul. 25, 2002

(51) Int. Cl.⁷ .............................................. H01S 3/10
(52) U.S. Cl. ....................... 372/26; 372/31; 372/29.023
(58) Field of Search ................. 372/26, 31, 29.023, 372/38.02

(56) References Cited

U.S. PATENT DOCUMENTS

2003/0053728 A1 * 3/2003 Yang ............................. 385/2
2003/0133652 A1 * 7/2003 Andrekson et al. ......... 385/27

OTHER PUBLICATIONS

N. S. Bergano, "Undersea Communication Systems", *Optical Fiber Telecommunications, vol. IVB*, Elsevier Science (USA) 2002, pp 154–197.
F. Liu et al, "Chirped Return–To–Zero Source Used In 8×10 Gbit/s Transmission Over 2000 km of Standard Singlemode Fiber", *Electron. Lett.* 36, (16), 2000, pp 1399–1400.
R. Ohhira et al, "Novel RZ Signal Format With Alternate–Chirp For Suppression of Nonlinear Degradation in 40 Gb/s Based WDM", *Proc. OFC '01*, Paper WM2, 2001.

* cited by examiner

*Primary Examiner*—Leon Scott, Jr.
(74) *Attorney, Agent, or Firm*—Barry H. Freedman; David Sasso

(57) ABSTRACT

Optical chirped return-to-zero (CRZ) data signals are generated without the need for a separate phase modulator, by using a dual-drive Mach-Zehnder modulator for RZ pulse carving that is driven with two typically sinusoidal signals of either unequal amplitude or unequal relative phase, i.e. of non-vanishing phase difference.

11 Claims, 4 Drawing Sheets

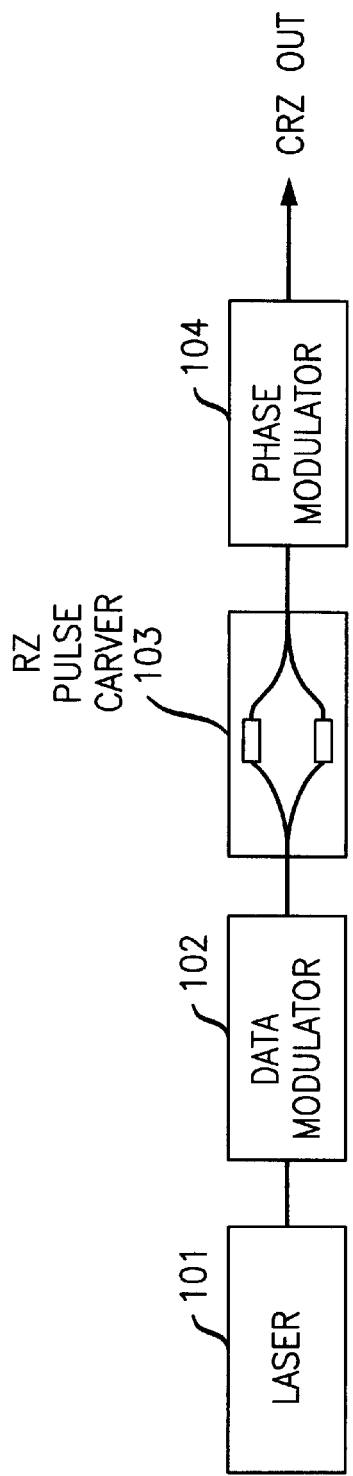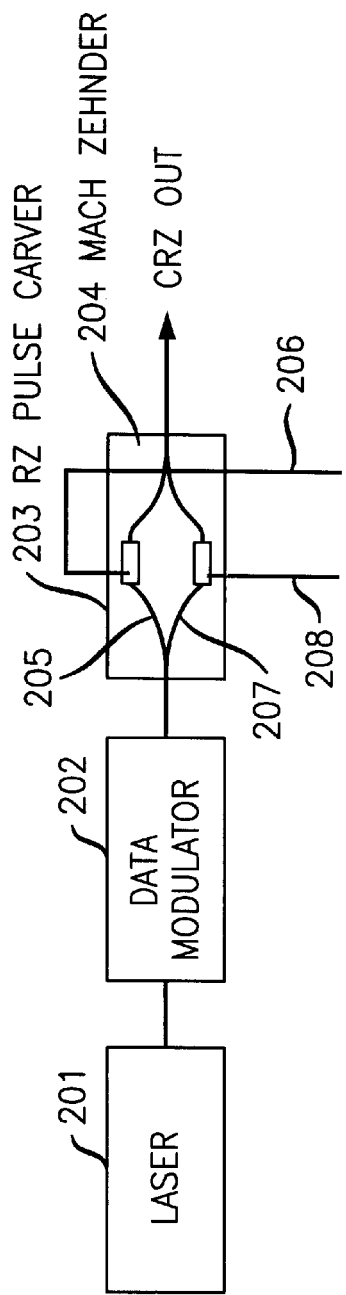

ARRANGEMENT FOR GENERATING CHIRPED RETURN TO ZERO (CRZ) OPTICAL DATA SIGNALS

FIELD OF INVENTION

This invention relates generally to the field of optical telecommunications, and in particular, to a method and apparatus for generating optical chirped return-to-zero (CRZ) data signals.

BACKGROUND OF THE INVENTION

Optical CRZ signals, i.e., signals in which (a) the optical intensity returns to zero during each bit period, and (b) the optical phase varies (by a desired amount) within each bit period, are important for ultra long distance optical fiber communications. Such signals can be advantageously used e.g., in undersea lightwave systems. For this class of systems, CRZ has been shown to yield high tolerance towards impairments caused by fiber nonlinearities. See, for example, N. S. Bergano, "Undersea Communication Systems", in *Optical Fiber Telecommunications IV* B, Academic Press, 2002.

One known arrangement for generating CRZ signals uses three optical modulators, as shown in FIG. 1. The first optical data modulator 102 imprints data modulation (among many other possible formats, e.g., non-return-to-zero on-off keying (NRZ-OOK), or NRZ-differential phase shift keying (NRZ-DPSK)) on the light emitted by a continuously operating laser 101. The second modulator 103 is a return-to-zero (RZ) pulse carver that carves RZ pulses out of the optical (usually NRZ) data signal. As indicated in FIG. 1, modulator 103 is frequently realized as a dual-drive Mach-Zehnder modulator using sinusoidal drive signals at either the data rate or at half the data rate. The third modulator 104 is a sinusoidally driven phase modulator that generates the desired amount of bit-synchronuous phase modulation, i.e. a phase term $$\exp[jm\cos(2\pi Rt)], \quad (1)$$

where m is called the modulation index.

Another known way of generating CRZ can be found in a paper by F. Liu et al., "Chirped return-to-zero source used in 8×10 Gbit/s transmission over 2000 km of standard singlemode fiber", *Electron. Lett.* 36 (16), 1399–1400, 2000, where a single Mach-Zehnder modulator is used to generate the data modulation, carve RZ pulses, and generate chirp. However, the maximum phase excursion obtainable from that scheme is limited to ~0.5 π without significantly degrading the data modulation.

SUMMARY OF THE INVENTION

In accordance with the present invention, optical chirped return-to-zero (CRZ) data signals are advantageously generated without the need for a separate phase modulator 104, as required in the prior art, by using a dual-drive Mach-Zehnder modulator (such as modulator 103 in FIG. 1) for RZ pulse carving that is driven with two typically sinusoidal signals of either unequal amplitude or unequal relative phase (i.e. with some non-vanishing phase difference).

BRIEF DESCRIPTION OF THE DRAWING

The present invention will be more fully appreciated by consideration of the following detailed description, which should be read in light of the drawing in which:

FIG. 1 is a block diagram of a prior art arrangement for generating CRZ signals that uses three optical modulators;

FIG. 2 is a block diagram of an arrangement in accordance with the present invention, for generating CRZ signals that does not need a separate phase modulator, as required in the prior art arrangement of FIG. 1;

DETAILED DESCRIPTION OF THE INVENTION

Figure 3:
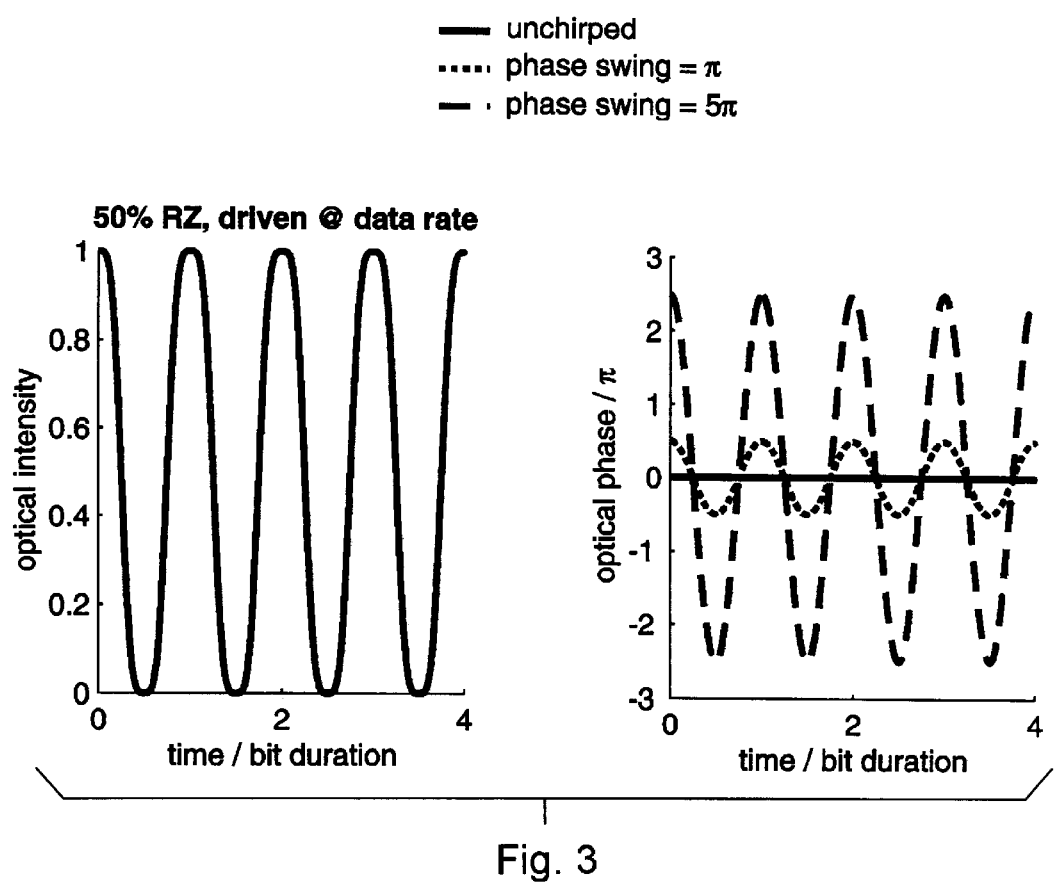
FIG. 3 is a diagram illustrating the optical intensity and chirped optical phase waveforms of signals generated using the arrangement of FIG. 2, in which the pulse carver is sinusoidally driven at the data rate R to generate RZ with around 50% duty cycle.

In accordance with the present invention, we have eliminated the need for a phase modulator for generating CRZ signals, by imbalancing the drive signals of the Mach-Zehnder modulator used for RZ pulse carving. As shown in FIG. 2, the light of a laser 201 is modulated with, for example, NRZ data, using a data modulator 202, to produce a modulated optical data signal. (It is to be noted here that modulator 202 can be any known modulator arranged to generate a modulated optical data signal, such as an NRZ OOK modulator, an NRZ DPSK modulator, a duobinary or modified duobinary modulator, a vestigial sideband modulator or a QPSK modulator, etc.) The modulated optical data signal output from modulator 202 is applied to a RZ pulse carver 203, which includes a Mach-Zehnder modulator 204 having first and second arms 205, 207, driven by first and second drive signals applied via control inputs or electrodes 206, 208, respectively. By arranging the drive signals to be imbalanced in phase or amplitude, the output of pulse carver 203 is the desired CRZ signal.

The invention is based on the following principle: The optical field $e_{RZ}(t)$ leaving the Mach-Zehnder pulse carver 203 is generally given by $$e_{RZ}(t)=e_{NRZ}(t)\exp[j\pi(u_1(t)+u_2(t))/(2V_\pi)]\cos[\pi(u_1(t)-u_2(t))/(2V_\pi)+\phi_{bias}]. \quad (2)$$

where $e_{NRZ}(t)$ denotes the NRZ modulated field generated by NRZ modulator 202 entering the pulse carver, and $u_1(t)$ and $u_2(t)$ are the drive voltage signals 206, 208 of the two modulator arms, 205, 207, respectively. These voltages are most conveniently chosen sinusoidal, having a frequency of either the data rate R or of R/2. The drive voltage required to achieve a phase shift of π in one of the modulator's arms is denoted $V_\pi$, and $\phi_{bias}$ the modulator bias.

Figure 4:
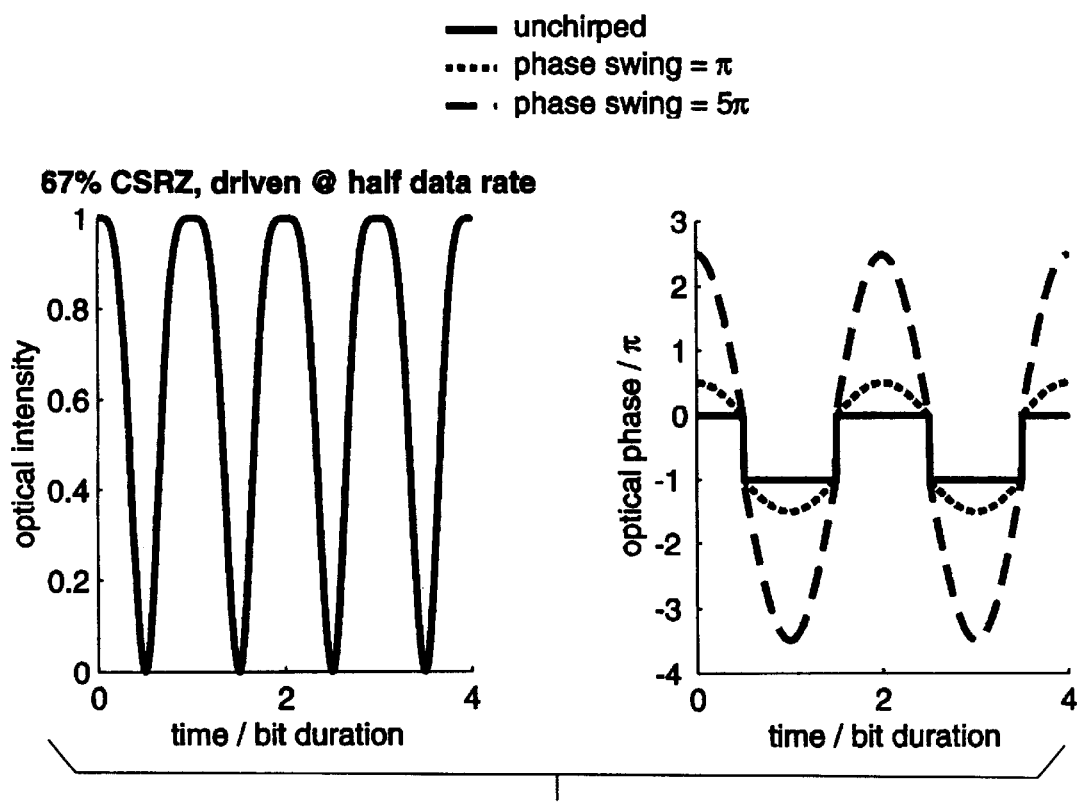
FIG. 4 is similar to FIG. 3, but the pulse carver is sinusoidally driven at half the data rate (R/2) and biased for zero transmission, carrier-suppressed RZ (CSRZ)
Figure 5:
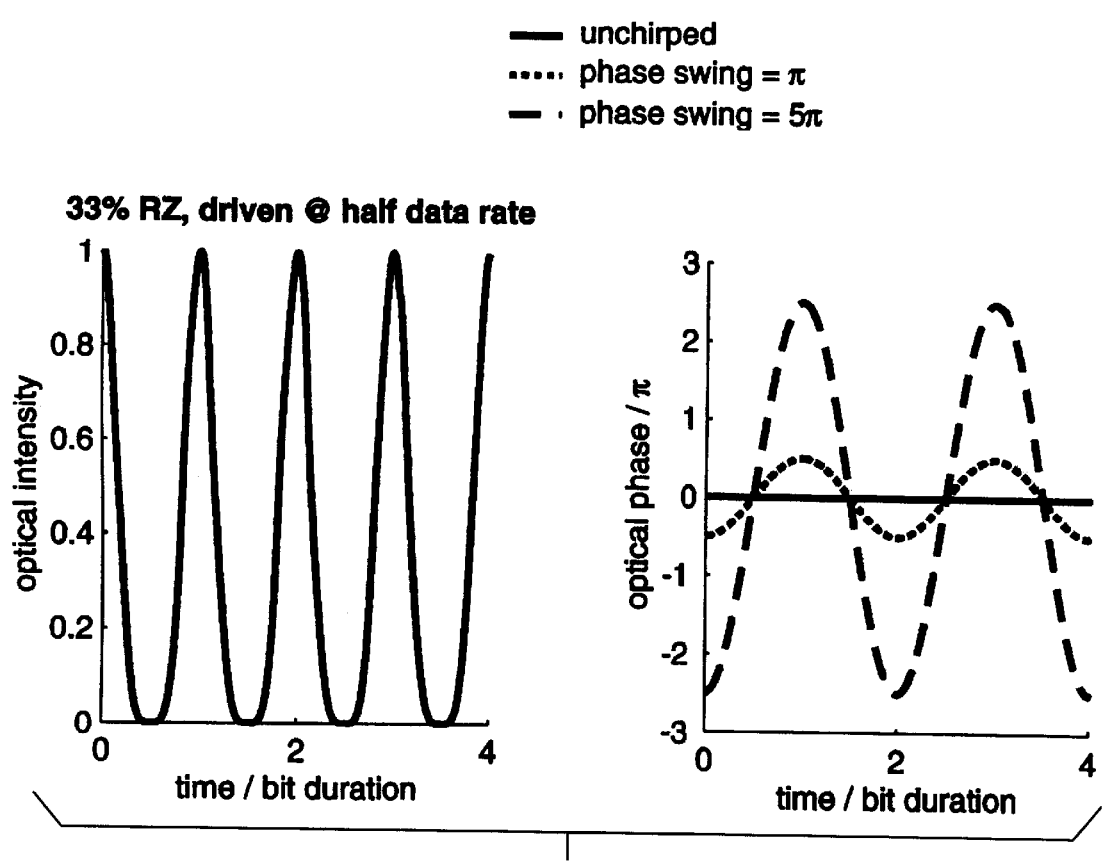
FIG. 5 is similar to FIG. 3, but the pulse carver is sinusoidally driven at half the data rate (R/2) and biased at maximum transmission to generate RZ with 33% duty cycle.

There are basically three types of RZ pulse carver driving to be distinguished, as shown in FIGS. 3, 4 and 5:

A. Pulse Carver Driven at the Data Rate R

If the pulse carver is sinusoidally driven at the data rate R with $$u_1(t)=U_1\cos[2\pi Rt], \text{ and } u_2(t)=U_2\cos[2\pi Rt], \quad (3)$$

and $\phi_{bias}$ is adjusted for maximum pulse extinction, RZ pulses with duty cycles between 50% and 33% can be generated by varying the difference of the two drive amplitudes, $U_\Delta=U_1-U_2$, from $V_\pi/2$ to 0. Usually, $U_1=-U_2=V_\pi/4$ (or, equivalently, $U_\Delta=V_\pi/2$) is chosen for chirp-free, 50% RZ pulse carving. Imbalancing the drive amplitudes under the constraint that their difference $U_\Delta$ remains constant does not change the intensity waveforms of the RZ pulses, but generates a bit-synchronuous, sinusoidal phase modulation with maximum phase excursions at the pulse center, as a consequence of the exponential term in Equation (2), which then reads $$\exp[j\pi(U_1+U_2)/(2V_\pi)\cos(2\pi Rt)]. \quad (4)$$

Comparing this expression to Equation (1), we identify the phase modulation index m as $$m=\pi(U_1+U_2)/(2V_\pi)=\pi U_\Sigma/(2V_\pi). \quad (5)$$

By changing the sum $U_\Sigma=U_1+U_2$ of the drive amplitudes while leaving their difference $U_\Delta$ constant, the amount of bit-synchronuous chirp can thus be easily tuned to any desired value. Also, by either changing the modulator bias $\phi_{bias}$ by $\pi$, or by exchanging the role of $u_1(t)$ and $u_2(t)$, the sign of the chirp can be changed from positive to negative. FIG. 3 illustrates this type of operation in terms of intensity (upper graph) and phase (lower graph) for three different amounts of chirp (m=0, m=$\pi/2$, m=2.5 $\pi$).

B. Pulse Carver Driven at R/2, Biased at Minimum Transmission

If the pulse carver is sinusoidally driven at half the data rate (R/2) and biased for zero transmission, carrier-suppressed RZ (CSRZ) is generated. The pulse duty cycle can be continuously changed from 67% (shown in FIG. 4) to 50% by varying $U_\Delta$ from $V_\pi$ to 0. If, according to our invention, the amplitudes of the carver are imbalanced, we achieve alternate-chirp CSRZ (AC-CSRZ), as proposed in [R. Ohhira, D. Ogasahara, and T. Ono, "Novel RZ signal format with alternate-chirp for suppression of nonlinear degradation in 40 Gb/s based WDM", *Proc. OFC'01*, paper WM2, 2001.] to mitigate nonlinear transmission effects. As for case A, we can choose any phase modulation index m by setting $U_\Sigma$ to the desired value. FIG. 4 illustrates this type of operation in terms of intensity (upper graph) and phase (lower graph) for three different amounts of chirp (m=0, m=$\pi/2$, m=2.5 $\pi$).

C. Pulse Carver Driven at R/2, Biased at Maximum Transmission

If the pulse carver is sinusoidally driven at half the data rate (R/2) and biased at maximum transmission, RZ with 33% duty cycle is generated. As opposed to cases A and B, the pulse shape cannot be tailored without degrading pulse extinction. Also, chirp cannot be generated by imbalancing the drive amplitudes. However, by imbalancing the relative phase between the two driving signals, AC-CSRZ signals with variable phase modulation index can be generated. Using the Ansatz $$u_1(t)=U_1\cos[\pi Rt], \text{ and } u_2(t)=U_2\cos[\pi Rt+\delta], \quad (6)$$

where $\delta$ represents a phase angle between the two drive signals, we calculate the modulation index m from Equations (1) and (2) as $$m=\pi U_1/V_\pi\cos(\delta/2). \quad (7)$$

Note that for this kind of pulse carver operation, the drive amplitudes $U_1$ and $U_2$ have to be adjusted as $U_1=U_2=V_\pi$ sqrt$[m^2/\pi^2+0.25]$ to assure good pulse extinction as well as no linear phase term that would cause pulse frequency shifts. FIG. 5 illustrates this type of operation in terms of intensity (upper graph) and phase (lower graph) for three different amounts of chirp (m=0, m=$\pi/2$, m=2.5 $\pi$).

Various modifications of this invention will occur to those skilled in the art. Nevertheless, all deviations from the specific teachings of this specification that basically rely upon the principles and their equivalents through which the art has been advanced are properly considered within the scope of the invention as described and claimed. For example, although the imbalanced signals have been described above as being sinusoidal, there may be instances in which non-sinusoidal drive signals may be preferred.

What is claimed is:

1. Apparatus for generating optical chirped return-to-zero (CRZ) signals, said apparatus comprising
   a laser,
   a first modulator for imprinting the output of said laser with a data signal to produce a modulated optical data signal, and
   a Mach-Zehnder modulator optically coupled to the first modulator, having first and second arms that are driven by first and second periodic drive signals, $u_1(t)$ and $u_2(t)$, respectively, wherein said first and second drive signals are imbalanced;
   and wherein the Mach-Zehnder modulator provides pulse carving and phase modulation of the output of said laser independent of the data modulation function performed by the first modulator to allow tuning of the chirp independent of the data modulation.

2. The invention defined in claim 1 where said drive signals have imbalanced amplitudes.

3. The invention defined in claim 2, wherein the Mach-Zehnder modulator is driven with two periodic signals of period 1/R or 2/R, where R is the data rate, and RZ pulses with desired shape and duty cycle are generated.

4. The invention defined in claim 3 wherein said periodic signals are $u_1(t)=U_1\cos[2\pi Rt]$, and $u_2(t)=U_2\cos[2\pi Rt]$, wherein $U_1$ is the amplitude of the first drive signal, R is the data rate, t is the time variable, and $U_2$ is the amplitude of the second drive signal.

5. The invention defined in claim 4 wherein RZ pulses with duty cycle between 50% and 33% are generated by selecting the difference of the two drive amplitudes, $U_\Delta=U_1-U_2$, in the range from $V_\pi/2$ to 0.

6. The invention defined in claim 3 wherein said periodic signals are $u_1(t)=U_1\cos[\pi Rt]$, and $u_2(t)=U_2\cos[\pi Rt]$.

7. The invention defined in claim 6 wherein RZ pulses with duty cycles between 67% and 50% are generated by selecting the difference of the two drive amplitudes, $U_\Delta=U_1-U_2$, in the range from $V_\pi$ to 0.

8. The invention defined in claim 1 where said drive signals have imbalanced phases.

9. The invention defined in claim 2 or 8 wherein said modulated optical data signal is generated by a first modulator chosen from the group consisting of an NRZ OOK modulator, a DPSK modulator, a duobinary or modified duobinary modulator, a vestigial sideband modulator and a QPSK modulator.

10. The invention defined in claim 8, wherein the Mach-Zehnder modulator is driven at the data rate R/2, and wherein the drive signals are arranged such that $u_1(t)=U_1\cos[\pi Rt]$, and $u_2(t)=U_2\cos[\pi Rt+\delta]$, where $\delta$ represents a non-zero phase angle between said two drive signals.

11. A method for generating optical chirped return-to-zero (CRZ) data signals, the method comprising:

modulating the output of a laser using a first modulator driven by a data signal to produce a modulated optical signal;

providing pulse carving and phase modulation of the output of the laser using a Mach-Zehnder modulator having first and second arms driven by imbalanced periodic signals to allow tuning of the chirp of the CRZ data signals independent of the data modulation.

* * * * *

UNITED STATES PATENT AND TRADEMARK OFFICE
CERTIFICATE OF CORRECTION

PATENT NO. : 6,693,929 B1
DATED : February 17, 2004
INVENTOR(S) : Rene'-Jean Essiambre and Peter J. Winzer It is certified that error appears in the above-identified patent and that said Letters Patent is hereby corrected as shown below:

<u>Title page,</u>
Add Item -- [73] Assignee: Lucent Technologies Inc., Murray Hill, N.J. --

Signed and Sealed this

Third Day of August, 2004

JON W. DUDAS
*Acting Director of the United States Patent and Trademark Office*